Figure 1:
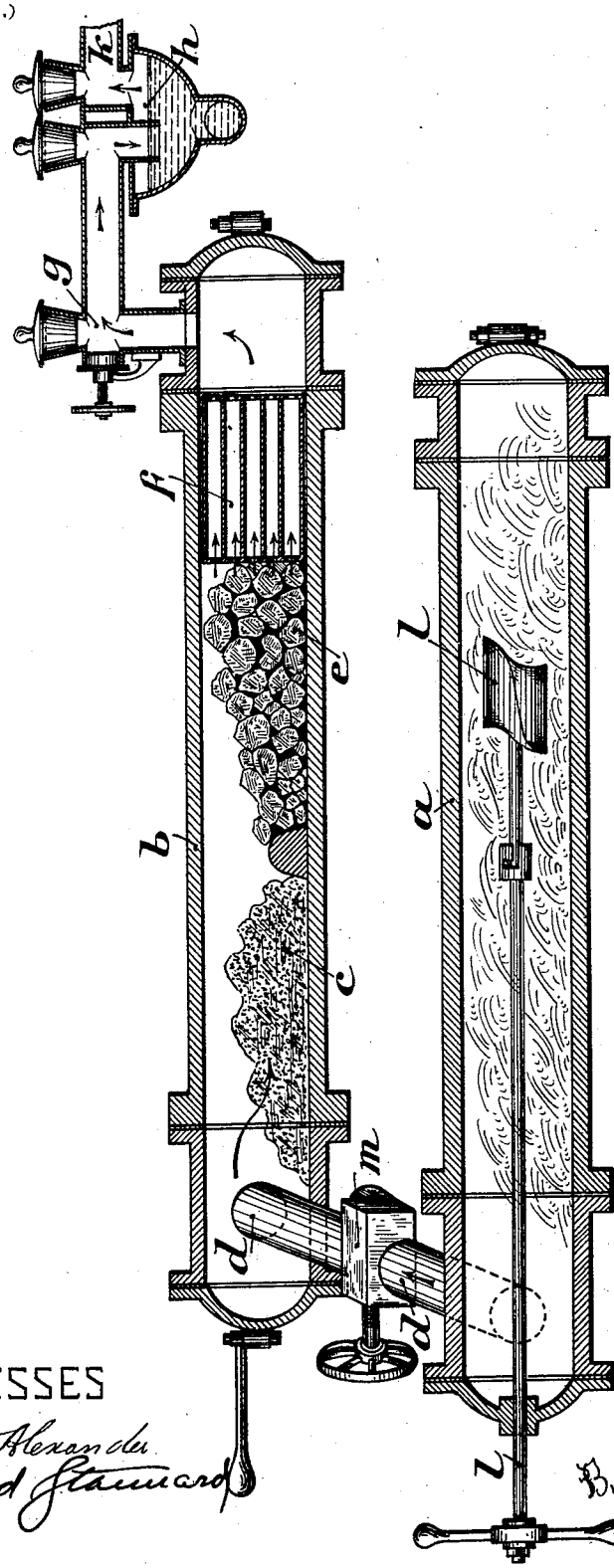

No. 683,065. Patented Sept. 24, 1901.
G. OTTERMANN.
PROCESS OF PRODUCING ILLUMINATING GAS.
(Application filed Dec. 14, 1899.)

(No Model.) 2 Sheets—Sheet 1.

WITNESSES
W. A. Alexander
David Stannard

INVENTOR
G. Ottermann
By Fowler & Fowler
ATTORNEYS

No. 683,065. Patented Sept. 24, 1901.
G. OTTERMANN.
PROCESS OF PRODUCING ILLUMINATING GAS.
(Application filed Dec. 14, 1899.)

(No Model.) 2 Sheets—Sheet 2.

UNITED STATES PATENT OFFICE.

GEORGE OTTERMANN, OF VIENNA, AUSTRIA-HUNGARY.

PROCESS OF PRODUCING ILLUMINATING-GAS.

SPECIFICATION forming part of Letters Patent No. 683,065, dated September 24, 1901.

Application filed December 14, 1899. Serial No. 740,291. (No specimens.)

*To all whom it may concern:*

Be it known that I, GEORGE OTTERMANN, a subject of the Emperor of Austria-Hungary, residing at Schottenbastei 4, Vienna, Austria-Hungary, have invented a certain new and useful Process of Producing Illuminating and Heating Gas from Household Refuse and Waste Substances, of which the following is such a full, clear, and exact description as will enable any one skilled in the art to which it appertains to make and use the same, reference being had to the accompanying drawings, forming part of this specification.

My invention relates to a process for producing illuminating and heating gas from waste organic substances, and particularly from those waste organic matters which are contained in ordinary household refuse. These waste products consist principally of organic compounds containing carbon, oxygen, hydrogen, and nitrogen and occasionally inorganic carbonates.

It has been found that when the gases and vapors distilled from waste household products are passed over heated neutral substances alone they are not materially improved, because, unlike the gases produced from richer materials, they now contain few convertible hydrocarbons. On the other hand, when such gases and vapors are passed over heated carbonaceous substances alone the conversion does not take place to a sufficient extent to furnish a useful gas. The reason for this is that the carbonaceous material must furnish the heat both for raising the gases to the temperature of dissociation and that required for the conversion of the gases. In consequence of this double duty the temperature of the carbonaceous material rapidly sinks below the temperature of dissociation and the fire-clay retort, in which the process takes place, does not conduct the heat of the furnace rapidly enough to supply the loss. This is particularly true during the first energetic evolution of the gases and vapors. In my process the gases and vapors from the waste products are first raised to the temperature of dissociation and then brought into contact with carbonaceous material to be converted into useful gas.

My invention consists, primarily, in heating waste household products, then bringing the gases and vapors generated therefrom into contact with a heated neutral substance, and then bringing the resulting gases into contact with heated carbonaceous material.

Figure 2:
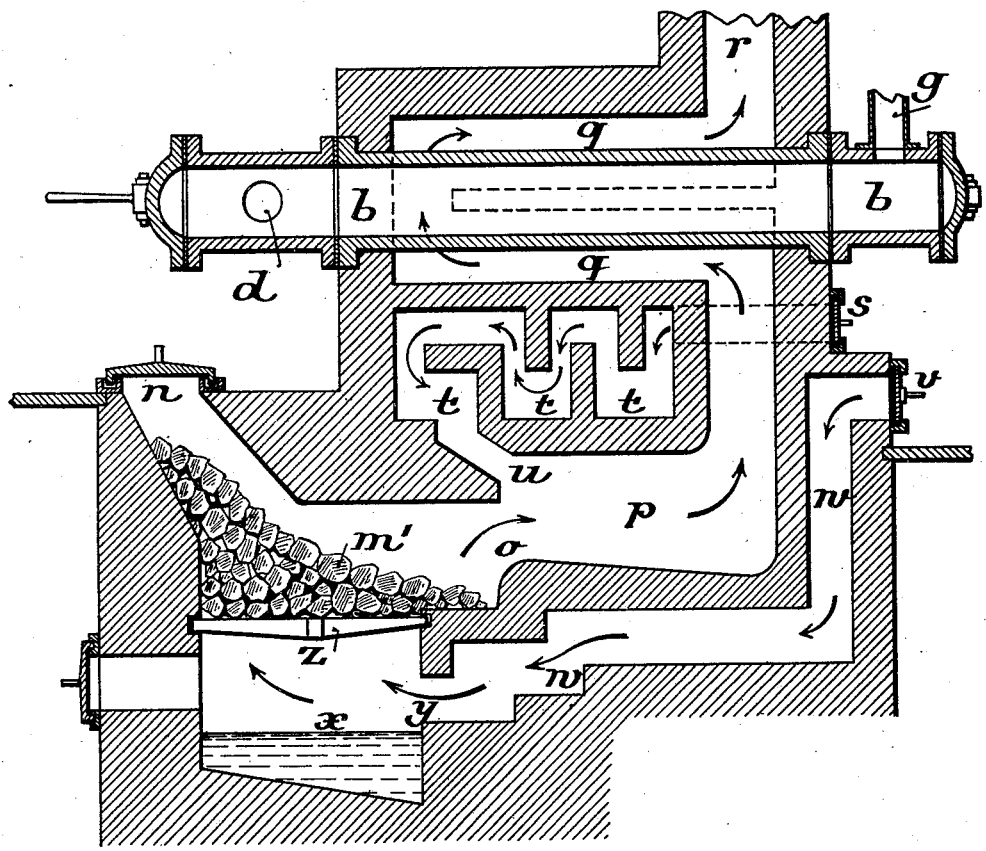

In the accompanying drawings, which illustrate one form of apparatus suitable for carrying out my process, Figure 1 is a perspective view showing the retort in section, and Fig. 2 is a vertical longitudinal section of a furnace for heating the retorts.

In the drawings, $a$ is a fire-clay retort, in which the distillation of the household refuse is effected. $b$ is a second fire-clay retort, into which the gas produced in the retort $a$ is conveyed through the connecting-pipe $d$. The retort $b$ contains in the space $c$ paper-ashes or other suitable chemically-indifferent material, while coke is placed in the space $e$. In the space $f$ of the retort $b$ an iron vessel is placed, which is divided into stages or shelves and is intended for receiving constituents for binding the nitrogen which passes through forming cyanids. Both retorts are built into the furnace. (Shown in Fig. 2.) The gas is evolved in the retort $a$, passes through the connecting-pipe $d$ into the conversion-retort $b$, then flows over the paper-ashes $c$, the coke $e$, and finally through the vessel $f$, from which it passes freed from its nitrogen through a discharge-pipe $g$ to the water seal $h$ into the pipe $k$, leading to the cooler and scrubber. It is essential for the assistance of the formation of gas and the production of a rapid distillation process that a stirring apparatus $i$, which projects through the retort $a$, should be used. The stirring apparatus consists of a rod with a handle and a stirrer or paddle, which may preferably have the form of an inclined plane or an oblique surface. The stirrer then passes through the iron cover of the retort. By the stirrer being turned and pushed to and fro a movement of the material to be distilled is produced, and when out of use the inlet-opening in the cover is tightly closed. The retort $a$ is fed through an opening lying opposite to the stirrer. The insertion of the paper and coke into the retort $b$ takes place at suitable intervals of time through the openings which are nearest to the said materials. In the refilling of coke, which takes place after about twenty-four hours, the vessel $f$, intended for the formation of cyanids, is removed and emptied and a similar vessel $f$ with fresh material is inserted in the retort $b$. In order to avoid as far as possible the admission of air, which is deleterious to the cyanids, a valve $m$ in the connecting-pipe is closed during the opening and closing of the retort $a$. The apparatus hereinbefore described may also be modified by connecting two or more vaporizing or distilling retorts with a single conversion-retort. One or more gas-evolving retorts may also be connected with several conversion-retorts in such a way that one conversion-retort contains only paper-ashes, the next one only coke, and the third one the compounds for forming the cyanid, and the gas is then forced successively through these conversion-retorts. Inclined retorts connected with one another may also be employed. The cyanid-forming apparatus may also be placed before the coke or between the coke and the paper-ashes, but with less effect. The furnace has an opening $n$ for the introduction of the fuel. The latter is conducted by the sliding shaft $m'$ to the grate $z$, where it is burned. The gases from the combustion pass over the fire-bridge to the combustion-chamber $p$, where they are completely burned by the air introduced at $u$. The gases are led by channels $q$ to the retort and pass along the retort, parallel to the longitudinal direction, to the flue $r$ and from this to the chimney. The primary air is introduced at $v$, passes through the channels $w$, whereby it is heated, and is conducted over the water-tank and comes out at $z$ below the grate-bars to the fuel. The secondary air enters at $s$ and passes through the channels $t$ to the chamber $u$, from which it comes into the combustion-chamber $p$.

In carrying out my process the retort $a$ is charged with the waste products and raised to a temperature of from 700° to 800° centigrade. The resulting gases and vapors then pass through the pipe $d$ and come in contact with the incandescent paper-ashes $c$ in the retort $b$. This brings the gases to such a temperature—for instance, 800° centigrade—that a dissociation and conversion, especially when in contact with incandescent coke, can take place. The gases now pass over the heated coke $e$, with which they combine to produce illuminating and heating gas. The nitrogen contained in the gas is removed by the materials in the vessel $f$.

Having fully described my invention, what I claim as new, and desire to secure by Letters Patent of the United States, is—

1. The process of producing gas from household refuse and similar organic waste substances, which consists in distilling the same, bringing the resulting gases in contact with heated neutral material, and then bringing said gases in contact with heated carbonaceous material.

2. The process of producing gas from household refuse and similar organic waste substances, which consists in distilling the same, bringing the resulting gases in contact with incandescent paper-ashes, and then bringing said gases in contact with heated carbonaceous material.

In witness whereof I have hereunto set my hand in presence of two witnesses.

GEORGE OTTERMANN.

Witnesses:
ALVESTO S. HOGUE,
AUGUST FUGGER.